(12) United States Patent
Hung et al.

(10) Patent No.: US 7,724,982 B2
(45) Date of Patent: May 25, 2010

(54) ESTIMATION OF LIGHTING CONDITIONS BASED ON NEAR-GRAY PIXEL DETECTION USING CYLINDRICAL BOUNDARIES

(75) Inventors: Szepo Robert Hung, Carlsbad, CA (US); Ying Xie Noyes, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 832 days.

(21) Appl. No.: 11/473,353

(22) Filed: Jun. 22, 2006

(65) Prior Publication Data

US 2007/0297011 A1    Dec. 27, 2007

(51) Int. Cl.
*G06K 9/40* (2006.01)
(52) U.S. Cl. .......................... 382/274; 382/167; 382/275
(58) Field of Classification Search ................. 382/162, 382/164, 167, 173, 254, 274, 275
See application file for complete search history.

(56) References Cited

U.S. PATENT DOCUMENTS

| | | | |
|---|---|---|---|
| 6,788,812 B1 * | 9/2004 | Wilkins | 382/167 |
| 2003/0052978 A1 | 3/2003 | Kehtarnavaz et al. | |
| 2004/0135899 A1 * | 7/2004 | Suemoto | 348/223.1 |
| 2005/0286097 A1 | 12/2005 | Hung et al. | |
| 2006/0078216 A1 * | 4/2006 | Kaku | 382/254 |
| 2006/0290957 A1 * | 12/2006 | Kim et al. | 358/1.9 |

FOREIGN PATENT DOCUMENTS

WO    0207426    1/2002

OTHER PUBLICATIONS

International Search Report—PCT/US07/071404—International Search Authority—European Patent Office—Dec. 14, 2007.

Jun-Yan Huo et al: "Robust automatic white balance algorithm using gray color points in images" Consumer Electronics, IEEE Transactions On, Online, vol. 52, No. 2, May 2006, pp. 541-546; XP007903612.

Liu Y-Ch et al: "Automatic white balance for digital still camera" IEEE Transactions on consumer electronics, IEEE Service Center, New York, NY, US, vol. 41, No. 3, Aug. 1, 1995, pp. 460-466, XP000539492.

(Continued)

*Primary Examiner*—Tom Y Lu
(74) *Attorney, Agent, or Firm*—George C. Pappas; Espartaco Diaz Hidalgo

(57) ABSTRACT

This disclosure describes image processing techniques that facilitate the determination of the lighting condition associated with an image. Once the lighting condition is determined, white balance can be performed on the image such as by applying white balance gains defined for the lighting condition. According to the techniques of this disclosure, gray point lines are defined and plotted for the different lighting conditions, and cylindrical bounding volumes are defined around the gray point lines, e.g., in a three-dimensional color space. The image is then analyzed with respect to each of the cylindrical bounding volumes to determine how many pixels of the image fall within the respective cylindrical bounding volumes formed around the gray point lines for the different lighting conditions. Based on this analysis, the actual lighting condition can be determined. The use of cylindrical bounding volumes can significantly improve the process of determining lighting conditions relative to conventional techniques.

51 Claims, 4 Drawing Sheets

OTHER PUBLICATIONS

Ching-Chih Weng et al: "A novel automatic white balance method for digital still cameras" Circuits and Systems, 2005. ISCAS 2005. IEEE International Symposium On, Online vol. 4, May 23, 2005-May 26, 2005, pp. 3801-3804, XP002460516.

* cited by examiner

ESTIMATION OF LIGHTING CONDITIONS BASED ON NEAR-GRAY PIXEL DETECTION USING CYLINDRICAL BOUNDARIES

TECHNICAL FIELD

The invention relates to image and video processing, and more particularly, to estimation of lighting conditions for white balance applications.

BACKGROUND

In digital camera applications, white balance can be an important process. White balance is typically used to correct for image sensor responses in order to better match an image with a user's perceptual experience of the object being imaged. The human eye can easily identify gray objects in all lighting conditions and interpret them as gray. For some imaging sensors, however, a white balance process is typically needed to make gray objects appear gray in the processed images.

There are multiple ways to perform automatic white balancing. The most commonly used approach is based on an assumption referred to as the "gray world assumption." The gray world assumption postulates that, for a picture that contains multiple colors, the average of all these colors will turn out to be gray.

The white balance process is typically dependent upon the lighting condition associated with an image. Thus, in order to accurately perform a white balance process on an image, it is necessary to determine the lighting condition associated with that image. Different lighting can cause gray pixels to be defined differently within a given color space.

SUMMARY

This disclosure describes image processing techniques that facilitate the determination of the lighting condition associated with an image. Once the lighting condition is determined, white balancing can be performed on the image, e.g., by applying white balance gains to respective colorimetric channels of the image. The gains used for the white balance process may be defined for the determined lighting condition.

To determine the lighting condition, different gray point lines are defined for different lighting conditions. The gray point lines define actual gray colors in terms of chrominance and luminance within a color space. Cylindrical bounding volumes, or the like, are defined around the gray point lines, e.g., in a three-dimensional color space. The image is then analyzed with respect to each of the cylindrical bounding volumes to determine how many pixels of the image fall within the respective cylindrical bounding volumes formed around the gray point lines for the different lighting conditions. Based on this analysis, the actual lighting condition can be determined.

In one embodiment, this disclosure provides a method comprising identifying near-gray pixels of an image for a plurality of different lighting conditions based on gray point lines defined for the different lighting conditions and bounding volumes defined around the gray point lines, and selecting one of the lighting conditions based on the near-gray pixels identified for the different lighting conditions.

In another embodiment, this disclosure provides a device comprising an image capture apparatus that captures an image, and an image processing unit that identifies near-gray pixels of the image for a plurality of different lighting conditions based on gray point lines defined for the different lighting conditions and bounding volumes defined around the gray point lines, and selects one of the lighting conditions based on the near-gray pixels identified for the different lighting conditions.

These and other techniques described herein may be implemented in a hardware, software, firmware, or any combination thereof. If implemented in software, the software may be executed in a digital signal processor (DSP) or other type of processor. The software that executes the techniques may be initially stored in a computer readable medium and loaded and executed in the DSP for effective processing of different sized images.

Accordingly, this disclosure also contemplates a computer readable medium comprising instructions stored therein that upon execution identify near-gray pixels of an image for a plurality of different lighting conditions based on gray point lines defined for the different lighting conditions and bounding volumes defined around the gray point lines, and select one of the lighting conditions based on the near-gray pixels identified for the different lighting conditions.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
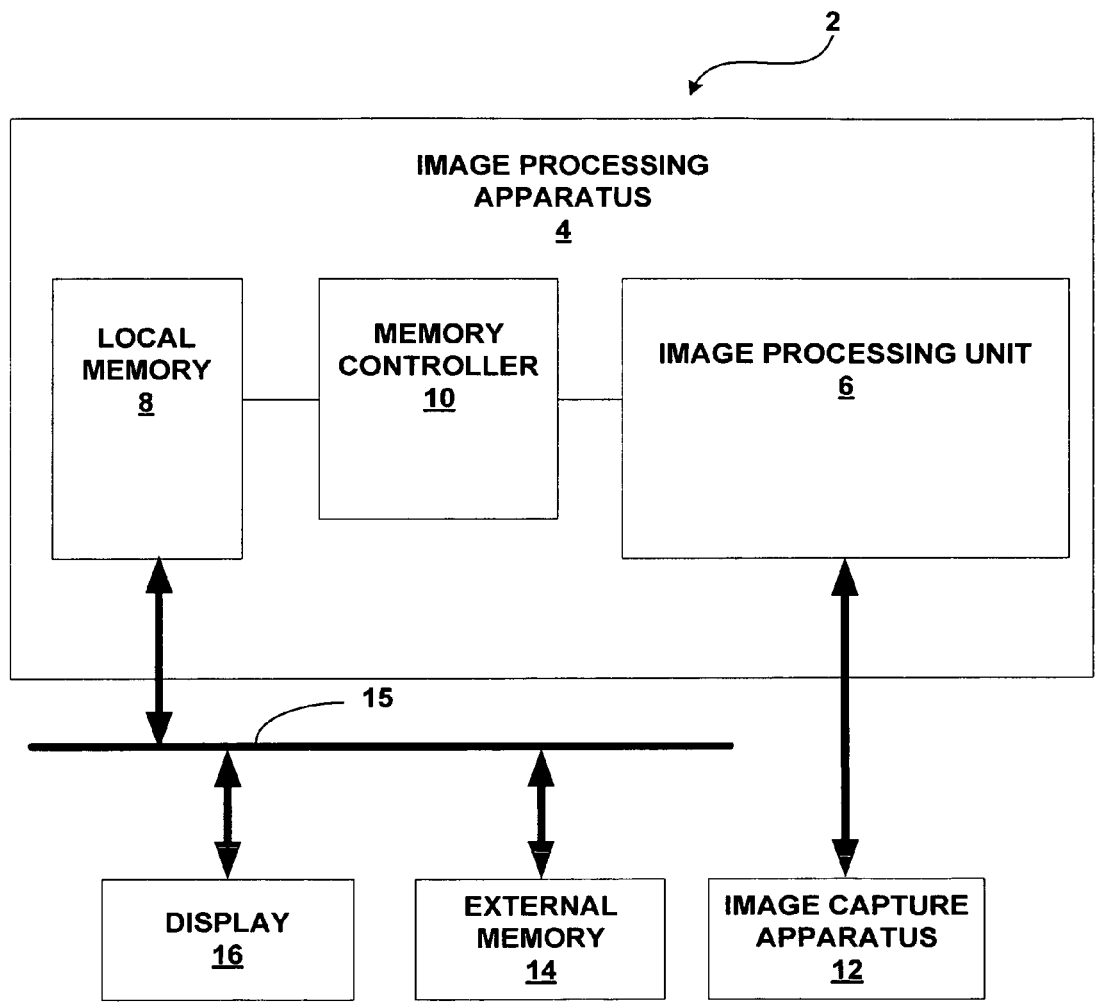
FIG. 1 is block diagram of an exemplary device that may implement techniques for determining lighting conditions to support a white balance process in accordance with this disclosure.

This disclosure describes image processing techniques that facilitate the determination of the lighting condition (sometimes referred to as the illuminant condition) associated with an image obtained by an image sensor, such as a camera. Once the lighting condition is determined, a white balance process can be performed on the image. The white balance process may involve application of white balance gains to respective colorimetric channels of the image. The gains may be defined for the lighting condition for the white balance process. White balance is a process used to correct for image sensor responses in order to better match an image with a user's perceptual experience of the object being imaged. The white balance process is typically needed to make gray objects actually appear gray in the processed images.

White balance is highly dependent upon the lighting condition identified for an image. If the wrong lighting condition is identified, white balance can actually impair image quality in some cases. If the correct lighting condition is identified, however, white balance usually improves image quality.

Essentially, white balance is a process of identifying one or more colors in an image that should appear white under the identified lighting. Gains or scaling can then be applied to various color channels so that the white area actually appears white. This often improves the color fidelity of saturated color areas of an image as well, by adjusting those colors using the gains from the white balance process. The gains or scaling applied to achieve white balance may be predetermined for different lighting conditions. Accordingly, it is necessary to determine the approximate lighting condition applicable to an image so that an appropriate set of white balance gains can be selected.

According to this disclosure, techniques are described for improving the determination of actual lighting conditions associated with an image. In particular, gray point lines are defined in a three-dimensional color space for the different lighting conditions, and bounding volumes are defined around the gray point lines within the three-dimensional color space. The gray point lines define actual gray colors in terms of chrominance and luminance within a color space. The bounding volumes extend about these actual gray lines to define near-gray volumetric regions for each lighting condition within a three-dimensional color space. According to this disclosure, the bounding volumes may be cylindrical in shape, although other shapes similar to cylinders may be used around the gray point lines with good results.

Pixels of the image are then compared to the bounding volumes for each respective lighting condition in the color space to determine which pixels of the image fall within the bounding volumes for each respective lighting condition. Cylindrical bounding volumes, or the like, can help to ensure that only those points that are within a respective distance or radius to the gray point line for a given lighting condition are considered near-gray pixels in that lighting condition.

The image can be analyzed with respect to each of the bounding volumes associated with respective lighting conditions in order to determine how many pixels of the image fall within the respective bounding volumes. Based on this analysis, the actual lighting condition can be determined by assuming (according to the gray world assumption) that the lighting condition that yields the most near-gray pixels is the actual lighting condition. Other variables and assumptions can also be used as part of this determination process. In any case, the use of bounding volumes, and specifically cylindrical bounding volumes, can significantly improve this process relative to conventional techniques by ensuring that non-gray pixels are not considered to be near-gray in the analysis.

FIG. 1 is a block diagram illustrating a device 2 that may implement the techniques of this disclosure. Device 2 may form part of an image capture device, or possibly a digital video device capable of coding and transmitting and/or receiving video sequences. By way of example, device 2 may comprise a stand-alone digital camera or video camcorder, a wireless communication device such as a cellular or satellite radio telephone, a personal digital assistant (PDA), or any device with imaging or video capabilities in which image processing is desirable.

As shown in FIG. 1, device 2 includes an image processing apparatus 4 to store raw image data and perform various processing techniques on such data. Apparatus 4 may comprise a so called "chip set" that includes a digital signal processor (DSP) on-chip memory, and possibly hardware logic or circuitry. More generally, apparatus 4 may comprise any combination of processors, hardware, software or firmware, and the various components of apparatus 4 may be implemented as such. Also, apparatus 4 may comprise a single integrated chip or a encoder/decoder (CODEC), if desired.

In the illustrated example of FIG. 1, image processing apparatus 4 includes a local memory 8, a memory controller 10 and an image processing unit 6. Image processing unit 6 performs the techniques of this disclosure. In particular, as described in greater detail below, image processing unit 6 identifies near-gray pixels of the image for a plurality of different lighting conditions based on gray point lines defined for the different lighting conditions and cylindrical bounding volumes defined around the gray point lines. Image processing unit 6 then selects one of the lighting conditions based on the near-gray pixels identified for the different lighting conditions.

Local memory 8 stores raw image data, and may also store processed image data following any processing that is performed by image processing unit 6. Memory controller 10 controls the memory organization within memory 8. Memory controller 10 also controls memory loads from local memory 8 to image processing unit 6, and write backs from image processing unit 6 to memory 8. The images processed by image processing unit 6 may be loaded directly into unit 6 from image capture apparatus 12 following image capture, or may be stored in local memory 8 during the image processing.

As noted, device 2 may include an image capture apparatus 12 to capture the images that are processed, although this disclosure is not necessarily limited in this respect. Image capture apparatus 12 may comprise arrays of solid state sensor elements such as complementary metal-oxide semiconductor (CMOS) sensor elements, charge coupled device (CCD) sensor elements, or the like. Alternatively, or additionally, image capture apparatus may comprise a set of image sensors that include color filter arrays (CFAs) arranged on a surface of the respective sensors. In either case, image capture apparatus 12 may be coupled directly to image processing unit 6 to avoid latency in the image processing. Other types of image sensors, however, could also be used to capture image data. Image capture apparatus 12 may capture still images, or possibly full motion video sequences, in which case the image processing may be performed on one or more image frames of the video sequence.

Device 2 may include a display 16 that displays an image following the image processing described in this disclosure. After such image processing, the image may be written to local memory 8 or external memory 14. The processed images may then be sent to display 16 for presentation to the user.

In some cases, device 2 may include multiple memories. For example, device 2 may include an external memory 14, which typically comprises a relatively large memory space. External memory 14, for example, may comprise dynamic random access memory (DRAM), or FLASH memory. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise synchronous dynamic random access memory (SDRAM).

In any case, memories 14 and 8 are merely exemplary, and may be combined into the same memory part, or may be implemented in a number of other configurations. In a preferred embodiment, local memory 8 forms a part of external memory 14, typically in SDRAM. In this case, both of memories 8 and 14 are "external" in the sense that neither memory is located "on-chip" with image processing unit 6. Alternatively, memory 8 may comprise on-chip memory buffers, while external memory 14 is external to the chip.

Device 2 may also include a transmitter (not shown) to transmit the processed images or coded sequences of images to another device. Indeed, the techniques of this disclosure may be very useful for handheld wireless communication devices (such as so-called cell-phones) that include digital camera functionality or digital video capabilities. In that case, the device would also include a modulator-demodulator (MODEM) to facilitate wireless modulation of baseband signals onto a carrier waveform in order facilitate wireless communication of the modulated information.

Local memory 8, display 16 and external memory 14 (and other components if desired) can be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

As noted above, white balance can be a very important process for digital camera applications or other applications that present images to users. Again, white balance is typically used to correct for image sensor responses in order to better match an image with a human viewer's perceptual experience of the object being imaged. Essentially, white balance is a process of identifying one or more colors in an image that should appear white under the identified lighting. Gains or other scaling can then be applied to various color channels so that the white area actually appears white. White balance typically refers to this process of scaling the color channels to adjust for lighting conditions. The scaling of color channels associated with a digital image can often improve the color fidelity of saturated color areas of an image as well by adjusting those colors using the gains from the white balance process.

However, white balance is highly dependent upon the lighting condition identified for an image. If the wrong lighting condition is identified, white balance can actually impair image quality in some cases. If the correct lighting condition is identified, however, white balance usually improves image quality. According to the techniques of this disclosure, techniques are described for improving the determination of actual lighting conditions associated with an image.

Figure 2:
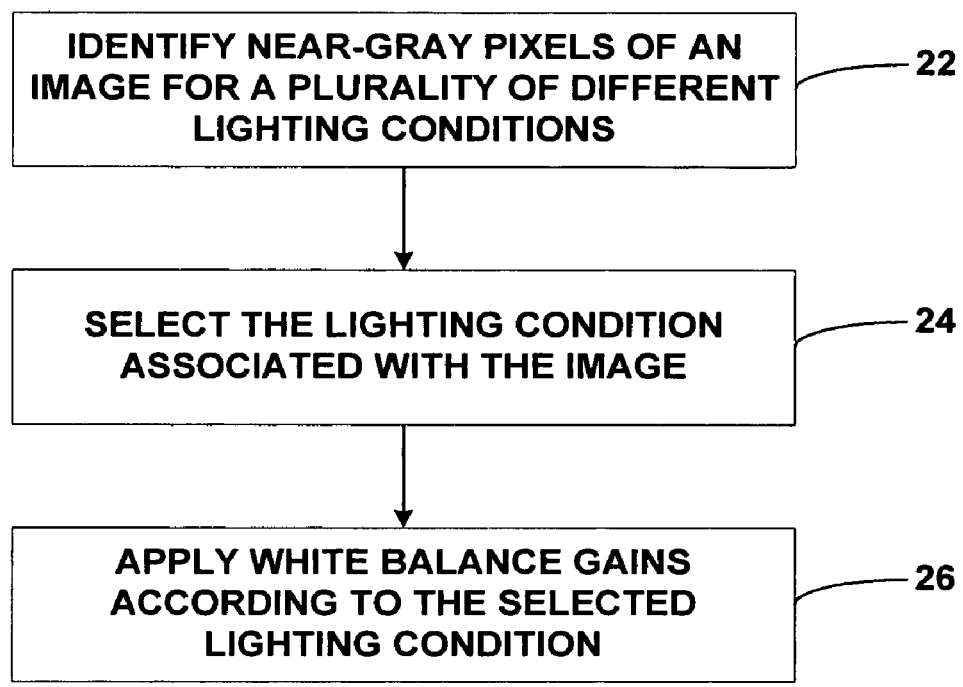
FIG. 2 is a flow diagram illustrating operation of a technique for determining lighting conditions in accordance with an embodiment of this disclosure.

FIG. 2 is a flow diagram illustrating a technique of this disclosure. As shown in FIG. 2, image processing unit 6 identifies near-gray pixels of an image for a plurality of different lighting conditions (22). More specifically, image processing unit 6 identifies the near-gray pixels based on gray point lines defined for the different lighting conditions and cylindrical bounding volumes defined around the gray point lines. For example, gray point lines may be defined in a three-dimensional color space for the different light conditions. These gray point lines define actual gray colors for the respective lighting conditions, and generally differ within the three-dimensional color space for the different lighting conditions. In other words, different lighting conditions define different gray point lines within the same color space. For each of the gray point lines associated with the different lighting conditions, a cylindrical bounding volume is defined about the respective gray point lines. In one example, a radius of approximately six pixels may be used to define the cylindrical bounding volumes about the respective gray point lines.

Image processing unit 6 then selects one of the lighting conditions based on the analysis of the image with respect to the cylindrical bounding volumes (24). In particular, image processing unit 6 selects one of the lighting conditions based on the near-gray pixels identified for the different lighting conditions. For example, image processing unit 6 may define the gray point lines for the different lighting conditions in a three-dimensional color space, define the cylindrical bounding volumes defined around the gray point lines in the three-dimensional color space, and identify pixels of the image that fall within the cylindrical bounding volumes for the different lighting conditions.

The process of selecting one of the lighting conditions (24) may comprise selecting a respective lighting condition based at least in part on a pixel count for that respective lighting condition. In other words, the respective lighting condition for which the most pixels of the image fall within the defined bounding volume for that lighting condition may be identified as the actual lighting condition for the image. In this sense, the techniques of this disclosure may rely somewhat on the "gray world assumption" insofar as the lighting condition for which the most pixels of the image fall within the defined bounding volume can be selected as the actual lighting condition. Other factors, however, may also be used along with the pixel counts.

For example, alternatively, the process of selecting one of the lighting conditions (24) may comprise selecting a respective lighting condition based at least in part on a pixel count for that respective lighting condition, and intensity of the pixels of the image. In this case, both the pixel intensities and the pixel counts are used to make the lighting condition selection. The use of pixel intensity along with the pixel counts for this selection process may improve the accuracy of the lighting condition selection. For example, a relative ranking of lighting conditions may be generated based on the number of pixels identified as near-gray for each lighting condition.

In yet another example, the process of selecting one of the lighting conditions (24) may comprise selecting a respective lighting condition based at least in part on a pixel count for that respective lighting condition, and one or more probability factors associated with the lighting conditions. This approach recognizes that some lighting conditions are highly improbably while other lighting conditions are much more likely. Thus, in this case, probability factors may be assigned to the different lighting conditions in order to favor selection of more probable lighting conditions and to avoid selection of less probable lighting conditions unless the less probable lighting conditions heavily outweigh the other lighting conditions in terms of pixel count in that respective bounding volume.

In still another example, the process of selecting one of the lighting conditions (24) may comprise selecting one of the lighting conditions based at least in part on a pixel count for that respective lighting condition, intensity of the pixels of the image, and one or more probability factors associated with the lighting conditions. Thus, this approach uses the pixel count, the pixel intensities and probability factors in order to make the selection. In still other cases, other factors may be defined to supplement these factors and possibly improve the selection process for selecting the lighting condition most likely to be that associated with the image.

Once the lighting condition is selected (24), image processing unit 6 may perform white balance on the image based on the selected one of the lighting conditions. In particular, the white balance process typically involves applying white balance gains to colorimetric channels the image. The white balance gains are defined (either pre-defined or dynamically defined) based on the selected one of the lighting conditions. In other words, given the lighting condition, the white balance gains may be defined for that lighting condition. As an example, image processing unit 6 may determine a white reference area in the image, and then adjust that area as well as other areas of the image by applying selected gains (for that lighting condition) on the color channels in order to improve the whiteness of the white reference area. The application of these gains to color channels may also improve color fidelity of areas of the image that exhibit highly saturated colors.

The techniques of this disclosure may work with many possible color spaces. However, in the example described in greater detail below, a Luminance-Chrominance (Red)-Chrominance(Blue) color space (YCrCb color space) is used. By way of example, the different lighting conditions may include two or more of the following: a shady color space, a cloudy (D65) color space, a direct sun (D50) color space, a cool white color space, a TL-84 color space, an incandescent color space, and a horizon color space.

According to this disclosure, the cylindrical bounding volumes help to ensure that only those points that are within a respective radius to the gray point line for a given lighting condition are considered near-gray pixels in that lighting condition. Other techniques, in contrast, may collect too many pixels as "near-gray" objects. The use of gray point lines in the YCrCb color space recognizes that gray point in a two-dimensional CrCb space changes linearly with respect to changes in Luminance (Y).

Figure 3:
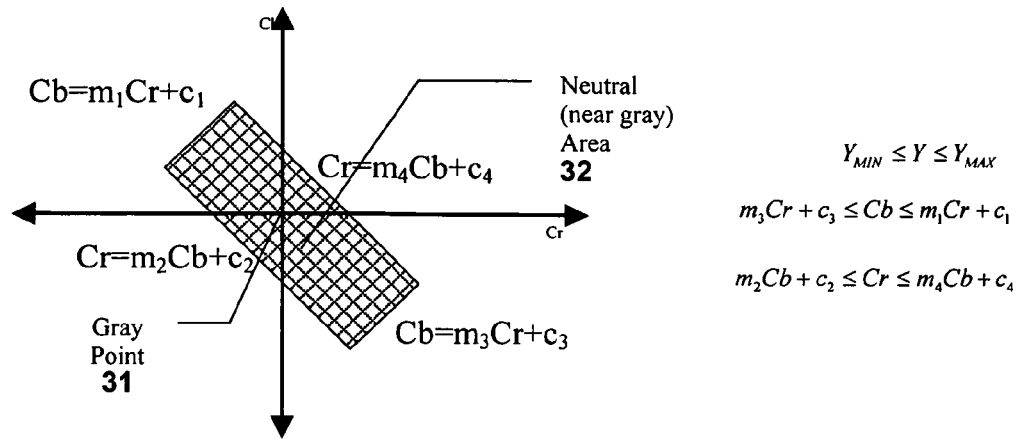
FIG. 3 is a graph illustrating a rectangular box for bounding gray pixels in two dimensions (Cr and Cb) of a YCrCb color space.
Figure 4:
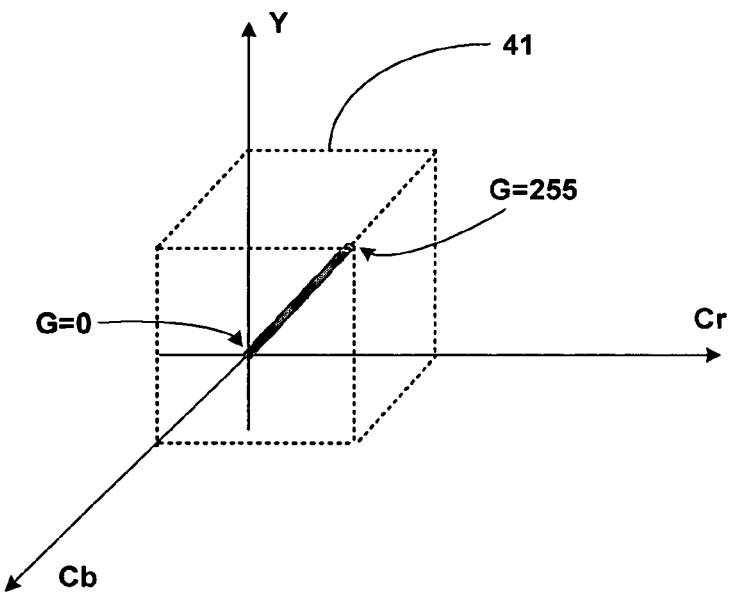
FIG. 4 is a three-dimensional graph illustrating a bounding volume in all three dimensions of the YCrCb color space, which corresponds to the rectangular box shown in FIG. 3.
Figure 5:
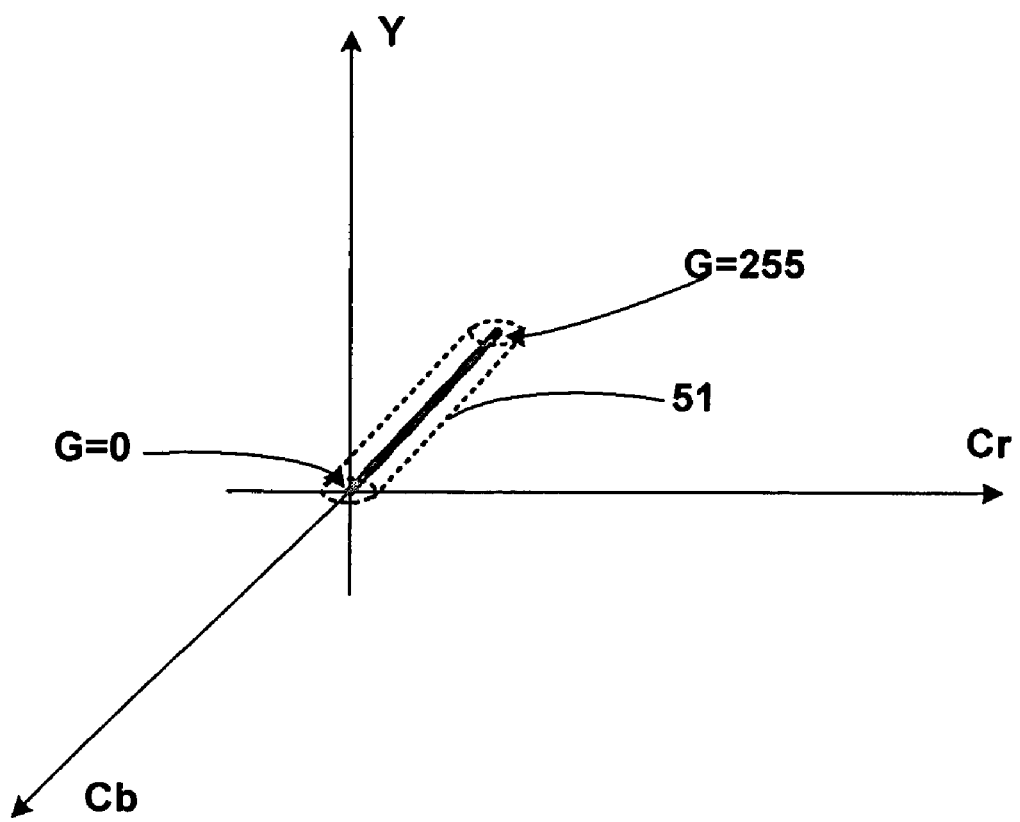
FIG. 5 is a three-dimensional graph illustrating a cylindrical bounding volume within a YCrCb color space and formed around a gray point line defined by a particular illuminant condition.

FIG. 3, for example, illustrates a bounding rectangle 32 in a Cb-Cr two-dimensional color space formed about gray point 31. If the technique of FIG. 2 were used with the enclosed area shown in FIG. 3, the bounding volume becomes a rectangular cube 41 in a three-dimensional YCbCr space as shown in FIG. 4. In this case, too many non-gray colors are included in rectangular cube 31.

Gray color under a certain lighting condition typically has the following relation:

$$R/G = k_1 \text{ (constant>0)} \quad \text{(Eq. 1)}$$

$$B/G = k_2 \text{ (constant>0)} \quad \text{(Eq. 2)}$$

Where R, G and B represents the Red, Green and Blue component of a color, respectively. The color in (R,G, B) space can be converted to the (Y,Cb,Cr) space by the following equations:

$$Y = 0.299 \times R + 0.587 \times G + 0.114 \times B \quad \text{(Eq. 3)}$$

$$C_b = 0.5 \times (B-G) \quad \text{(Eq. 4)}$$

$$C_r = 0.5 \times (R-G) \quad \text{(Eq. 5)}$$

Rearranging Equations 3-5, one can obtain:

$$C_b = 0.5 \times (B-G) = 0.5 \times (k_2 \times G - G) = 0.5 \times (k_2-1) \times G = M_b \times G \quad \text{(Eq. 6)}$$

Where $M_b = 0.5 \times (k_2-1)$

Similarly, $$\begin{aligned} C_r &= 0.5 \times (R-G) = \\ & 0.5 \times (k_1 \times G - G) = 0.5 \times (k_1-1) \times G = M_r \times G \end{aligned} \quad \text{(Eq. 7)}$$

where $M_r = 0.5 \times (k_1 - 1)$ and $$\begin{aligned} Y &= 0.299 \times R + 0.587 \times G + 0.114 \times B \\ &= 0.299 \times k_1 \times G + 0.587 \times G + 0.114 \times k_2 \times G \\ &= (0.299 \times k_1 + 0.587 + 0.114 \times k_2) \times G \\ &= M_y \times G \end{aligned} \quad \text{(Eq. 8)}$$

where $M_y = (0.299 \times k_1 + 0.587 + 0.114 \times k_2)$.

For a fixed lighting condition, $k_1$ and $k_2$ are constant. Therefore, the gray color is actually defined by a straight line unless $k_1=1$ and $k_2=1$. By varying G from 0 to 255 (e.g., defined in digital values over an 8-bit domain), the gray color corresponding to a specific lighting condition is a straight line in three-dimensional color space. Different gray color lines are defined for different lighting conditions.

It can be shown experimentally that using a 3-D rectangular cube (e.g., like that of FIG. 4) to bound the gray objects permits the consideration of too many non-gray pixels. In this case, pixels that are identified as being gray according to the rectangular cube do not actually appear gray to the human eye. In order to remedy this over inclusion of gray pixels, this disclosure proposes defining a volume about the gray point lines, e.g., a tubular volumetric shape in a three-dimensional color space, formed about the gray point lines. This can more tightly bound the definition of "near-gray" in the three-dimensional color space.

In order to define the bounding volumes for each lighting condition, image processing unit 6 can be programmed based on the following. From Equations 6-8, one can derive:

$$\begin{cases} Y = M_y \times G \\ C_b = M_b \times G \\ C_r = M_b \times G \end{cases} \quad \text{(Eq. 9)}$$

For a certain Y level, the Cb and Cr can be represented as $$C_b = M_b \times G = \frac{M_b}{M_y} \times Y \quad \text{(Eq. 10)}$$

$$C_r = M_r \times G = \frac{M_r}{M_y} \times Y \quad \text{(Eq. 11)}$$

The value $M_y$ is a positive constant and is never zero.

For each pixel with value (Y', Cb', Cr') the pixel is tested with the following inequality to determine whether it is near-gray or not:

$$\left(C_b' - \frac{M_b}{M_y} \times Y'\right)^2 + \left(C_r' - \frac{M_r}{M_y} \times Y'\right)^2 \leq T \quad \text{(Eq. 12)}$$

Where the positive variable T determines the radius of a tubular volume that bounds the true gray point line. The value of T may be less than 50, less than 30, less than 20, or possibly less than 10 pixels in length. In one specific example, the value T is 6 pixels although other radius sizes could be used.

Equation 12 can be future simplified as:

$$(C_b' - S_1 \times Y')^2 + (C_r' - S_2 \times Y')^2 \leq T \quad \text{(Eq. 13)}$$

Where $S_1 = \frac{M_b}{M_y}$ and $S_2 = \frac{M_r}{M_y^2}$ are pre-computed constants.

Each lighting condition includes its own unique cylindrical (in this case tubular) volume, which is used to detect the near-gray pixels associated with that given lighting condition.

Seven possible lighting conditions are listed above. However, a smaller or larger number of lighting conditions may be considered. In this example, up to seven bounding cylinders can be used by image processing unit 6 (FIG. 1). Each bounding cylinder can be subjected to further restriction in Y, if desired, according to:

$$Y\_min \leq Y \leq Y\_max \qquad \text{(Eq. 14)}$$

In this case, the value Y_min is determined by the noise level present in the signal. By restricting Y to be greater than Y_min, collection of misleading information caused by the noise can be avoided. An upper bound Y_max can also be determined by the color channel saturation. If any color channel is saturated, the collected R/G and B/G value is no longer valid due to clipping.

As an example, the seven different lighting conditions may be defined using reference points that are calibrated according to the following TABLE 1.

TABLE 1

| Lighting Condition | R/G Ratio | B/G Ratio |
| --- | --- | --- |
| D65 | 0.65 | 0.83 |
| Shade | 0.60 | 0.90 |
| Incandescent | 1.10 | 0.51 |
| Cool White | 0.76 | 0.54 |
| Warm Fluorescent | 0.87 | 0.59 |
| Horizon | 1.28 | 0.46 |
| D50 | 0.77 | 0.69 |

Based on these parameters, gray point lines can be defined for each respective lighting condition in a three-dimensional color space. For comparison purposes, a bounding rectangle on the Cb-Cr domain can be obtained to collectively bound all of the gray point lines. A graphical illustration of such a bounding rectangle 61 is shown in FIG. 6. The parameters for the four bounding lines are determined in the way that it gives the tightest boundary for all possible gray point lines projected to the two-dimensional Cb-Cr space.

Volumetric bounding tubes or cylinders can be set up for each gray point line. Each tube or cylinder is formed around one of the gray point lines for a respective lighting condition, and may have the same value of T, e.g, T=30, which determines the radius of the bounding tube. Furthermore, each tube defines parameters S1 and S2 (defined above), and these parameters are computed from the given reference points.

In order to verify the effectiveness of cylindrical bounding volumes according to this disclosure, gray pixel estimation can be compared between the bounding rectangle on the Cb-Cr domain and the cylindrical bounding volumes for the different lighting conditions. For both techniques, the same Y_min and Y_max can be used for brightness level thresholding. If a pixel is classified as a "near-gray" pixel, this pixel is replaced with a constant gray value so that the detected near-gray pixels can be visualized.

An experiment was performed to compare the performance of the techniques of this disclosure using cylindrical volumes with a technique that used less bounded rectangles. Original raw images were read and processed with demosaic to obtain three colors per pixel. The demosaiced images were then processed under the different lighting conditions using cylindrical bounding volumes, and using a bounding rectangle. Comparisons under each of the lighting conditions clearly showed that the proposed bounding cylinder method provided much tighter control of identifying near-gray pixels in all lighting conditions. Because white balance techniques rely on the accuracy of the near-gray object detection, it is very important to detect the near-gray objects in images in an accurate manner. According to the techniques of this disclosure, the accuracy of such near-gray object detection is improved by using bounding tubes (cylindrical bounding volumes) in three-dimensional color space, relative to a bounding rectangle in a two-dimensional color space.

A number of image processing techniques have been described. The techniques may be implemented in hardware, software, firmware, or any combination thereof. If implemented in software, the techniques may be directed to a computer readable medium comprising program code thereon that when executed in a device causes the device to perform one or more of the techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, or the like.

The program code may be stored on memory in the form of computer readable instructions. In that case, a processor such as a DSP may execute instructions stored in memory in order to carry out one or more of the image processing techniques. In some cases, the techniques may be executed by a DSP that invokes various hardware components to accelerate the image processing. In other cases, the units described herein may be implemented as a microprocessor, one or more application specific integrated circuits (ASICs), one or more field programmable gate arrays (FPGAs), or some other hardware-software combination.

Nevertheless, various modifications may be made to the techniques described herein. For example, although the techniques have been described primarily in the context of YCrCb color space, similar techniques could be applied in other color spaces. Also, the list of possible lighting conditions above is only exemplary and may be limited or expanded for other implementations. Furthermore, while much of the foregoing discussion has focused on defining cylindrical bounding volumes around the gray point lines, other types of bounding volumes could alternatively be used, as long as the volumes are defined with respect to the gray point lines in a three-dimensional color space. These and other embodiments are within the scope of the following claims.

The invention claimed is:

1. A method comprising:
   identifying near-gray pixels of an image for a plurality of different lighting conditions based on gray point lines defined for the different lighting conditions and bounding volumes defined around the gray point lines; and
   selecting one of the lighting conditions based on the near-gray pixels identified for the different lighting conditions.

2. The method of claim 1, wherein the bounding volumes are cylindrical bounding volumes defined around the gray point lines.

3. The method of claim 1, further comprising performing white balance on the image based on the selected one of the lighting conditions.

4. The method of claim 3, wherein performing white balance comprises applying white balance gains to the image, the white balance gains being defined based on the selected one of the lighting conditions.

5. The method of claim 1, wherein identifying the near-gray pixels includes:
   defining the gray point lines for the different lighting conditions in a three-dimensional color space;

defining cylindrical bounding volumes defined around the gray point lines in the three-dimensional color space; and identifying pixels of the image that fall within the cylindrical bounding volumes for the different lighting conditions.

6. The method of claim 5, wherein selecting one of the lighting conditions comprises selecting a respective lighting condition based at least in part on a pixel count for that respective lighting condition.

7. The method of claim 5, wherein selecting one of the lighting conditions comprises selecting a respective lighting condition based at least in part on:
   a pixel count for that respective lighting condition; and
   intensity of the pixels of the image.

8. The method of claim 5, wherein selecting one of the lighting conditions comprises selecting a respective lighting condition based at least in part on:
   a pixel count for that respective lighting condition; and
   one or more probability factors associated with the lighting conditions.

9. The method of claim 5, wherein selecting one of the lighting conditions comprises selecting a respective lighting condition based at least in part on:
   a pixel count for that respective lighting condition;
   intensity of the pixels of the image; and
   one or more probability factors associated with the lighting conditions.

10. The method of claim 5, wherein the color space comprises a Luminance-Chrominance(Red)-Chrominance(Blue) color space.

11. The method of claim 5, wherein the cylindrical bounding volumes defined around the gray point lines define radiuses about the gray point lines of less than approximately 30 pixels.

12. The method of claim 1, further comprising capturing the image.

13. The method of claim 1, wherein the plurality of lighting conditions include:
   a shady lighting condition;
   a cloudy (D65) lighting condition;
   a direct sun (D50) lighting condition;
   a cool white lighting condition;
   a TL-84 lighting condition;
   an incandescent lighting condition; and
   a horizon lighting condition.

14. A computer-readable medium comprising instructions stored therein that upon execution:
   identify near-gray pixels of an image for a plurality of different lighting conditions based on gray point lines defined for the different lighting conditions and bounding volumes defined around the gray point lines; and
   select one of the lighting conditions based on the near-gray pixels identified for the different lighting conditions.

15. The computer-readable medium of claim 14, further comprising instructions that upon execution perform white balance on the image based on the selected one of the lighting conditions.

16. The computer-readable medium of claim 15, wherein the instructions upon execution perform white balance on the image by applying white balance gains to the image, the white balance gains being defined based on the selected one of the lighting conditions.

17. The computer-readable medium of claim 14, the instructions upon execution:
   define the gray point lines for the different lighting conditions in a three-dimensional color space;

define cylindrical bounding volumes defined around the gray point lines in the three-dimensional color space; and count pixels of the image that fall within the cylindrical bounding volumes for the different lighting conditions.

18. The computer-readable medium of claim 17, the instructions upon execution select one of the lighting conditions based at least in part on a pixel count for that respective lighting condition.

19. The computer-readable medium of claim 17, the instructions upon execution select one of the lighting conditions based at least in part on:
   a pixel count for that respective lighting condition; and
   intensity of the pixels of the image.

20. The computer-readable medium of claim 17, the instructions upon execution select one of the lighting conditions based at least in part on:
   a pixel count for that respective lighting condition; and
   one or more probability factors associated with the lighting conditions.

21. The computer-readable medium of claim 17, the instructions upon execution select one of the lighting conditions based at least in part on:
   a pixel count for that respective lighting condition;
   intensity of the pixels of the image; and
   one or more probability factors associated with the lighting conditions.

22. The computer-readable medium of claim 14, wherein the color space comprises a Luminance-Chrominance(Red)-Chrominance(Blue) color space.

23. The computer-readable medium of claim 14, wherein the bounding volumes are cylindrical bounding volumes defined around the gray point lines that define radiuses around the gray point lines of less than approximately 30 pixels.

24. The computer-readable medium of claim 14, wherein the plurality of lighting conditions include:
   a shady lighting condition;
   a cloudy (D65) lighting condition;
   a direct sun (D50) lighting condition;
   a cool white lighting condition;
   a TL-84 lighting condition;
   an incandescent lighting condition; and
   a horizon lighting condition.

25. A device comprising
   an image capture apparatus that captures an image; and
   an image processing unit that identifies near-gray pixels of the image for a plurality of different lighting conditions based on gray point lines defined for the different lighting conditions and bounding volumes defined around the gray point lines, and selects one of the lighting conditions based on the near-gray pixels identified for the different lighting conditions.

26. The device of claim 25, wherein the bounding volumes are cylindrical bounding volumes defined around the gray point lines.

27. The device of claim 24, wherein the image processing unit performs white balance on the image based on the selected one of the lighting conditions.

28. The device of claim 27, wherein the image processing unit applies white balance gains on the image, the whit balance gains being defined based on the selected one of the lighting conditions.

29. The device of claim 25, wherein the image processing unit:
   defines the gray point lines for the different lighting conditions in a three-dimensional color space;

defines cylindrical bounding volumes defined around the gray point lines in the three-dimensional color space; and counts pixels of the image that fall within the cylindrical bounding volumes for the different lighting conditions.

30. The device of claim 29, wherein the image processing unit selects one of the lighting conditions based at least in part on a pixel count for that respective lighting condition.

31. The device of claim 29, wherein the image processing unit selects one of the lighting conditions based at least in part on:
a pixel count for that respective lighting condition; and
intensity of the pixels of the image.

32. The device of claim 29, wherein the image processing unit selects one of the lighting conditions based at least in part on:
a pixel count for that respective lighting condition; and
one or more probability factors associated with the lighting conditions.

33. The device of claim 29, wherein the image processing unit selects one of the lighting conditions based at least in part on:
a pixel count for that respective lighting condition;
intensity of the pixels of the image; and
one or more probability factors associated with the lighting conditions.

34. The device of claim 29, wherein the color space comprises a Luminance-Chrominance(Red)-Chrominance(Blue) color space.

35. The device of claim 29, wherein the cylindrical bounding volumes defined around the gray point lines define radiuses around the gray point lines of approximately 6 pixels.

36. The device of claim 25, wherein the plurality of lighting conditions include:
a shady lighting condition:
a cloudy (D65) lighting condition;
a direct sun (D50) lighting condition;
a cool white lighting condition;
a TL-84 lighting condition;
an incandescent lighting condition; and
a horizon lighting condition.

37. The device of claim 25, wherein the image capture apparatus includes one of charge coupled device (CCD) sensors and complimentary metal oxide semiconductor (CMOS) sensors.

38. The device of claim 25, wherein the image capture apparatus comprises a video capture device and the image frame of a video sequence.

39. An apparatus comprising:
means for identifying near-gray pixels of an image for a plurality of different lighting conditions based on gray point lines defined for the different lighting conditions and bounding volumes defined around the gray point lines; and
means for selecting one of the lighting conditions based on the near-gray pixels identified for the different lighting conditions.

40. The apparatus of claim 39, wherein the means for bounding volumes are cylindrical bounding volumes defined around the gray point lines.

41. The apparatus of claim 39, further comprising means for performing white balance on the image based on the selected one of the lighting conditions.

42. The apparatus of claim 41, wherein means for performing white balance comprises applying white balance gains to the image, the white balance gains being defined based on the selected one of the lighting conditions.

43. The apparatus of claim 39, wherein identifying the near-gray pixels includes:
means for defining the gray point lines for the different lighting conditions in a three-dimensional color space;
means for defining cylindrical bounding volumes defined around the gray point lines in the three-dimensional color space; and
means for identifying pixels of the image that fall within the cylindrical bounding volumes for the different lighting conditions.

44. The apparatus of claim 43, wherein means for selecting one of the lighting conditions comprises selecting a respective lighting condition based at least in part on a pixel count for that respective lighting condition.

45. The apparatus of claim 43, wherein means for selecting one of the lighting conditions comprises selecting a respective lighting condition based at least in part on:
a pixel count for that respective lighting condition; and
intensity of the pixels of the image.

46. The apparatus of claim 43, wherein means for selecting one of the lighting conditions comprises selecting a respective lighting condition based at least in part on:
a pixel count for that respective lighting condition; and
one or more probability factors associated with the lighting conditions.

47. The apparatus of claim 43, wherein means for selecting one of the lighting conditions comprises selecting a respective lighting condition based at least in part on:
a pixel count for that respective lighting condition;
intensity of the pixels of the image; and
one or more probability factors associated with the lighting conditions.

48. The apparatus of claim 43, wherein the color space comprises a Luminance-Chrominance(Red)-Chrominance(Blue) color space.

49. The apparatus of claim 43, wherein the cylindrical bounding volumes defined around the gray point lines define radiuses about the gray point lines of less than approximately 30 pixels.

50. The apparatus of claim 39, further comprising means for capturing the image.

51. The apparatus of claim 39, wherein the plurality of lighting conditions include:
a shady lighting condition;
a cloudy (D65) lighting condition;
a direct sun (D50) lighting condition;
a cool white lighting condition;
a TL-84 lighting condition;
an incandescent lighting condition; and
a horizon lighting condition.

* * * * *

UNITED STATES PATENT AND TRADEMARK OFFICE
CERTIFICATE OF CORRECTION

PATENT NO. : 7,724,982 B2  
APPLICATION NO. : 11/473353  
DATED : May 25, 2010  
INVENTOR(S) : Hung et al.

Page 1 of 1

It is certified that error appears in the above-identified patent and that said Letters Patent is hereby corrected as shown below:

Column 11, line 30, claim 10: "Luminance-Chrominance(Red)-Chrominance(Blue)" to read as --Luminance-Chrominance (Red)-Chrominance (Blue)--

Column 11, line 39, claim 13: "include" to read as --includes--

Column 12, line 30, claim 22: "Luminance-Chrominance(Red)-Chrominance(Blue)" to read as --Luminance-Chrominance (Red)-Chrominance (Blue)--

Column 12, line 37, claim 24: "include" to read as --includes--

Column 12, line 61, claim 28: "whit balance" to read as --white balance--

Column 13, line 28, claim 34: "Luminance-Chrominance(Red)-Chrominance(Blue)" to read as --Luminance-Chrominance (Red)-Chrominance (Blue)--

Column 13, line 34, claim 36: "include" to read as --includes--

Column 14, line 41, claim 48: "Luminance-Chrominance(Red)-Chrominance(Blue)" to read as --Luminance-Chrominance (Red)-Chrominance (Blue)--

Column 14, line 50, claim 51: "include" to read as --includes--

Signed and Sealed this  
Fifth Day of July, 2011

David J. Kappos  
*Director of the United States Patent and Trademark Office*